United States Patent
Messing et al.

(10) Patent No.: US 11,965,483 B2
(45) Date of Patent: Apr. 23, 2024

(54) METHOD FOR OPERATING A WIND FARM, WIND POWER INSTALLATION AND WIND FARM

(71) Applicant: Wobben Properties GmbH, Aurich (DE)

(72) Inventors: Ralf Messing, Aurich (DE); Malte Heyen, Leer (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/169,577

(22) Filed: Feb. 15, 2023

(65) Prior Publication Data
US 2023/0258155 A1 Aug. 17, 2023

(30) Foreign Application Priority Data
Feb. 15, 2022 (EP) .................................... 22156723

(51) Int. Cl.
- *F03D 7/02* (2006.01)
- *F03D 7/04* (2006.01)
- *F03D 17/00* (2016.01)

(52) U.S. Cl.
CPC ........... *F03D 7/0276* (2013.01); *F03D 7/049* (2023.08); *F03D 17/008* (2023.08);
(Continued)

(58) Field of Classification Search
CPC ...... F03D 7/0224; F03D 7/024; F03D 7/0276; F03D 7/042; F03D 7/045; F03D 7/048;
(Continued)

(56) References Cited

U.S. PATENT DOCUMENTS

| | | |
|---|---|---|
| 11,441,537 B2 | 9/2022 | Messing |
| 2009/0099702 A1 | 4/2009 | Vyas et al. |

(Continued)

FOREIGN PATENT DOCUMENTS

| | | |
|---|---|---|
| EP | 3 536 948 A1 | 9/2019 |
| EP | 3 926 162 A1 | 12/2021 |

(Continued)

*Primary Examiner* — Christopher Verdier
(74) *Attorney, Agent, or Firm* — Seed IP Law Group LLP (57) ABSTRACT

A method for operating a wind farm having a first wind power installation and a second wind power installation, to an associated wind power installation and to an associated wind farm. The second wind power installation is located in the wake of the first wind power installation in at least one wake wind direction. A tip-speed coefficient is determined from the ratio of a second tip-speed ratio of the second wind power installation and a first tip-speed ratio of the first wind power installation and a pitch-angle coefficient is determined from the ratio of a second pitch angle of the second wind power installation and a first pitch angle of the first wind power installation. The method comprises: determining a turbulence metric, in particular a turbulence intensity, at the second wind power installation; operating the first wind power installation and the second wind power installation in the wake wind direction in a part-load range, wherein the tip-speed coefficient and/or the pitch-angle coefficient are/is a function of the turbulence metric at the second wind power installation and are/is greater than one.

18 Claims, 6 Drawing Sheets

(52) U.S. Cl.
CPC . *F05B 2270/101* (2013.01); *F05B 2270/1031* (2013.01); *F05B 2270/1033* (2013.01); *F05B 2270/204* (2020.08); *F05B 2270/30* (2013.01); *F05B 2270/304* (2013.01); *F05B 2270/32* (2013.01); *F05B 2270/327* (2013.01); *F05B 2270/328* (2013.01); *F05B 2270/331* (2013.01); *F05B 2270/335* (2013.01)

(58) Field of Classification Search
CPC .. F03D 7/049; F03D 17/008; F05B 2270/101; F05B 2270/1011; F05B 2270/1031; F05B 2270/1033; F05B 2270/204; F05B 2270/32; F05B 2270/328; F05B 2270/304; F05B 2270/331; F05B 2270/332; F05B 2270/335; F05B 2270/327; F05B 2270/30

See application file for complete search history.

(56) References Cited

U.S. PATENT DOCUMENTS

| | | | |
|---|---|---|---|
| 2015/0267686 A1* | 9/2015 | Kjaer et al. | F03D 9/255 290/44 |
| 2017/0335827 A1* | 11/2017 | Wilson | F03D 17/00 |
| 2021/0396209 A1 | 12/2021 | Bott et al. | |
| 2022/0136484 A1* | 5/2022 | Länger-Möller | F03D 7/0276 290/44 |
| 2022/0307476 A1 | 9/2022 | Messing et al. | |
| 2022/0389906 A1* | 12/2022 | Shartzer | F03D 7/048 |

FOREIGN PATENT DOCUMENTS

| | | |
|---|---|---|
| WO | 2019/138132 A1 | 7/2019 |
| WO | 2019/197680 A1 | 10/2019 |

* cited by examiner

METHOD FOR OPERATING A WIND FARM, WIND POWER INSTALLATION AND WIND FARM

BACKGROUND

Technical Field

The present invention relates to a method for operating a wind farm, to a wind power installation and to a wind farm.

Description of the Related Art

Wind power installations are still built as individual installations only in rare cases; nowadays they are mostly in the form of a plurality of installations in a spatially limited area. Such a collection of wind power installations is referred to as a wind farm and the spacing between the individual wind power installations there is typically only a few multiples of the installation diameter.

When the number of installations is small, the installations can still be positioned one behind the other in only two rows; however, when there are a greater number of installations on the wind farm, the installations also have to be arranged in three or more rows. On such a wind farm, the operation of the individual installation is no longer uninfluenced but rather is disrupted by the operation of the neighboring installation according to the wind direction.

This becomes particularly obvious when an installation is in the wake of another installation in a particular wind direction, that is to say when the two installations are one behind the other in the wind direction. Because the front installation slows down the wind speed in the rotor blade plane in order to draw kinetic energy from the wind and to convert this kinetic energy into electrical energy, there is now only a lower wind speed available to the rear installation in the wake of the front installation for generating electrical energy. Moreover, the wind field downstream of the front installation will have a different form from upstream of the front installation in terms of characteristic wind field parameters such as turbulence intensity, vertical and horizontal shear, wind direction and change in wind direction with altitude.

The laws that apply on a wind farm are thus markedly different from those for an individual installation, the inflow for which is not disrupted by obstacles. For example, the yield from a wind farm is thus usually not the sum of the yields from the individual installations existing on the wind farm if the yield that an individual installation achieves in an undisrupted wind field is calculated for the individual installations. The stability of and the loads on installations on the wind farm likewise typically have to be checked too, in particular if they are located in the wake of other installations due to the wind conditions.

According to the prior art, it is often necessary to pare down installations on the wind farm so that there is stability and compliance with design loads. Paring down the installation is understood, then, to mean that, for example, the rated power, or rather the rated speed, is reduced or the pitch angle is increased. This may occur either at the installation which is in the front row with respect to the inflow direction (passive protection) or in rear rows, that is to say in the wake of another installation (active protection).

Also, in terms of increasing the farm yield, it is prior art to operate installations in the front row with an increased pitch angle, for example, in order to reduce the blocking in the rotor blade plane, that is to say to decrease the axial induction, as a result of which the wind speed downstream of the front installation is increased and a higher wind speed is therefore available to the rear installation for energy conversion. Although the yield from the installations in the front row is decreased, this loss of yield ought to be more than compensated for by increased yields from the installations in the subsequent rows on the wind farm, with the result that the yield from the wind farm as a whole rises.

Various approaches for optimizing the control of wind power installations on a wind farm have accordingly been attempted.

BRIEF SUMMARY

Provided is a method for operating a wind farm, an associated wind power installation and an associated wind farm that allow an improvement in yield.

In one aspect, a method for operating a wind farm having a first wind power installation and a second wind power installation is proposed, wherein the second wind power installation is located in the wake of the first wind power installation in at least one wake wind direction, wherein a tip-speed coefficient is determined from the ratio of a second tip-speed ratio of the second wind power installation and a first tip-speed ratio of the first wind power installation and wherein a pitch-angle coefficient is determined from the ratio of a second pitch angle of the second wind power installation and a first pitch angle of the first wind power installation.

The method comprises the steps of: determining a turbulence metric, in particular a turbulence intensity, at the second wind power installation, and operating the first wind power installation and the second wind power installation in the wake wind direction in a part-load range, wherein the tip-speed coefficient and/or the pitch-angle coefficient are/is a function of the turbulence metric at the second wind power installation and are/is greater than one.

In this implementation, the part-load range extends in a range from 0 kW to the rated power of the wind power installation. It thus comprises both a range with a tip-speed ratio that is known to be approximately constant and a range with a varying tip-speed ratio.

Wake wind direction should be understood to mean in particular a wind direction range in which the installation downstream in the wind direction is influenced by the installation upstream in the wind direction. In other words, a wake wind direction is always present if the wind power installation located in the wake, due to the presence of the installation upstream in the wind direction, is subjected to different wind conditions from those to which an installation with freely inflowing wind would be subjected. A wake wind direction is thus a wind direction within a range of the wind directions that is relevant to the wake effect.

The other wind conditions, which are caused by the wake, can include in particular a different wind speed and/or a different measure of turbulence, in particular a different turbulence intensity. Other parameters, such as a different wind direction related to deflection, are likewise conceivable too.

The tip-speed ratio $\lambda$ indicates the ratio of the circumferential speed u of the rotor to the wind speed v. The pitch angle, or angle of pitch, refers to the angle between the rotor plane of the rotor of the wind power installation and the chord of the rotor blade.

A suitable turbulence metric is in particular a turbulence intensity, wherein other metrics, such as a degree of turbulence defined as a dimensionless variable for describing the quality of an external flow, are also suitable.

The turbulence intensity is preferably defined as the ratio of the standard deviation of the wind speed to the mean value of the wind speed based on time intervals of in particular 10 minutes. The turbulence intensity is a measure of the variability of the wind speed within this period of time.

It is thus recognized that, in the part-load range, a tip-speed ratio at the second wind power installation in the wake of the first wind power installation is advantageously greater than the tip-speed ratio of the first wind power installation. Alternatively or in addition, the pitch angle at the second wind power installation can also similarly advantageously be greater than the pitch angle at the first wind power installation.

The functional relationship between the relatively increased tip-speed ratio and the relatively increased pitch angle is given by the turbulence metric. It has thus been shown that optimized control of the whole wind farm with the result of an optimum yield requires finely differentiated wake control.

The relevant factor is thus not the absolute tip-speed ratio or the absolute pitch angle at the first or the second wind power installation, but the ratio thereof with respect to one another. Advantageously, the ratio is such that the second wind power installation controls the higher tip-speed ratio or the higher pitch angle. This can be done by virtue of the second wind power installation increasing the tip-speed ratio and/or the pitch angle; alternatively or in addition, the first wind power installation can also lower the tip-speed ratio and/or the pitch angle or in any case raise the tip-speed ratio and/or the pitch angle to a lesser degree than the second wind power installation. The tip-speed coefficient or the pitch-angle coefficient of greater than one can accordingly be achieved by way of various control interventions.

Particularly preferably, the method will involve the control of the second wind power installation raising the tip-speed ratio and the pitch angle substantially at the same time with the aim that a thrust coefficient of the rotor of the second wind power installation remains substantially unchanged. The improvement in yield on the wind farm can therefore be made in a substantially load-neutral manner.

Additionally, the tip-speed coefficient and/or the pitch-angle coefficient are not only greater than one but in addition a function of the turbulence metric. The functional dependency on the turbulence metric means that the setting of the tip-speed coefficient or of the pitch-angle coefficient is specifically adapted and the total energy yield from the wind farm is increased.

The second tip-speed ratio is preferably increased in such a way that a maximized power coefficient of the second wind power installation is obtained in consideration of a maximum permissible thrust coefficient.

In particular, an increase in the tip-speed ratio can be accompanied by a load increase related to operational management. This can be permissible only until the designed loads of the installation are reached or any residual safety margins are completely used.

The designed loads of the installation are complied with in any case when the tip-speed ratio, in particular the combination of tip-speed ratio and pitch angle, is selected in such a way that the thrust coefficient at the resulting operating point lies within a permissible range. It should be noted here that the thrust coefficient must not deviate substantially from standard operation so that any predicted loads on the installation itself and on the installations which are located in the wake of this installation remain valid.

Particularly preferably, the tip-speed ratio or the combination of tip-speed ratio and pitch angle is increased in such a way that the thrust coefficient remains substantially constant. Power-maximized operation is therefore achieved while complying with the designed loads even in the wake of a wind power installation.

As an alternative or in addition to the thrust coefficient, a forward-backward bending moment of the tower of the wind power installation can be ascertained in order to deduce the thrust.

An increase in the tip-speed ratio is preferably limited in such a way that the rated speed is not exceeded. This ensures that the wind power installation does not reach an overspeed.

The second tip-speed ratio and the second pitch angle are preferably increased in such a way that a maximized power coefficient of the second wind power installation is obtained in consideration of a maximum permissible thrust coefficient.

The maximum permissible thrust coefficient is preferably a location-dependent thrust coefficient which is dependent in particular on an air density and/or the wind speed.

Further influencing variables for the thrust coefficient include, for example, those from aerodynamics, control, and therefrom in particular pitch angle and torque. For the location-dependent thrust coefficient, the wind speed and the air density are particularly preferably the decisive factors.

A decision about whether the pitch-angle coefficient is increased in addition to the tip-speed coefficient is preferably made depending on operating conditions at the site of the first and/or second wind power installation.

The operating conditions at the site of the first and/or the second wind power installation preferably include wind conditions and environmental or ambient conditions. The wind conditions include at least one from a wake-disrupted turbulence, the wind speed, an oblique inflow, an altitude profile of the wind speed and the air density. The ambient conditions preferably include at least one from temperature and humidity in order to recognize possible icing of the rotor blade, for example. The conditions mentioned are of course exemplary and not exhaustive.

In one implementation, the data pertaining to the operating conditions can be based on a prediction, that is to say in particular as a combination of statistics and modelling, and/or can be measured, in particular directly measured or indirectly measured.

The decision is preferably made depending on location loads at the site and/or on the installation type of the second wind power installation.

In this implementation, the location loads are in particular the mechanical loads acting on the installation structure of the second wind power installation. In one implementation, the mechanical loads can be based on a prediction, for example on an aeroelastic prediction, or can be measured, in particular directly measured or indirectly measured.

In principle, only the rear installation, that is to say the second wind power installation, is relevant. However, since this wind power installation is affected by the wake of the front installation, the location loads on the rear wind power installation are also dependent on those on the front wind power installation.

The smaller the relative spacing between the first and second installation, the higher the impact from wake turbulence and accordingly also the location loads. The relative spacing between the wind power installations is preferably accordingly used for correcting or improving the location loads at the second wind power installation.

It also holds that the higher the thrust coefficient of the front installation, the higher the wake turbulence and accordingly the location loads. The wake turbulence is therefore preferably also used for correcting or improving in particular the predicted location loads.

Aside from the location loads, the reserves of the wind power installation preferably play a role, in particular the aerodynamic reserves and the load-related reserves.

The permissible range of the increase in the tip-speed ratio and/or in the pitch angle of the second wind power installation can preferably be predefined by a life control system, in particular a central wind farm computer. For this purpose, the grid infeed point can preferably be observed or monitored. Additionally, load monitoring for the second wind power installation, which in any case is carried out approximately in real time, should preferably be used. This can be used in this case to define the operating point of the second wind power installation, that is to say in particular the permissible range of the increase in the tip-speed ratio and/or in the pitch angle, for a maximized power coefficient.

A maximum power coefficient is preferably determined for the determined turbulence intensity at the second wind power installation, wherein the operating point related to the maximum power coefficient the operating parameters tip-speed ratio and pitch angle are determined, wherein the second wind power installation is operated at the operating point having the maximum power coefficient if the thrust coefficient obtained is permissible at the specific location.

An air density is preferably taken into consideration when setting the second tip-speed ratio and/or the second pitch angle.

In a further aspect, a wind power installation on a wind farm is proposed, wherein the wind farm contains the wind power installation and a further wind power installation, wherein the wind power installation is located in the wake of the further wind power installation in at least one wake wind direction, wherein a tip-speed coefficient is determined from the ratio of a tip-speed ratio of the wind power installation and a tip-speed ratio of the further wind power installation and wherein a pitch-angle coefficient is determined from the ratio of a pitch angle of the wind power installation and a pitch angle of the further wind power installation, comprising a controller which is designed to determine a turbulence intensity at the wind power installation and to operate the wind power installation in the wake wind direction in a part-load range in such a way that the tip-speed coefficient and/or the pitch-angle coefficient are/is a function of the turbulence intensity at the wind power installation and are/is greater than one.

The wind power installation based on this aspect makes it possible to achieve the same advantages as those disclosed with reference to the method described above. In particular, operation of the wind power installation on the wind farm with an optimized total yield is made possible.

The combination of the wind power installation with the particular configurations of the method described as preferred is also advantageous.

In a further aspect, a wind farm having a wind power installation and a further wind power installation is proposed, wherein the wind power installation is located in the wake of the further wind power installation in at least one wake wind direction, wherein a tip-speed coefficient is determined from the ratio of a tip-speed ratio of the wind power installation and a further tip-speed ratio of the further wind power installation and wherein a pitch-angle coefficient is determined from the ratio of a pitch angle of the wind power installation and a further pitch angle of the further wind power installation, comprising a controller which is designed to determine a turbulence intensity at the wind power installation and to operate the wind power installation and the further wind power installation in the wake wind direction in a part-load range in such a way that the tip-speed coefficient and/or the pitch-angle coefficient are/is a function of the turbulence intensity at the wind power installation and are/is greater than one.

The wind farm based on this aspect makes it possible to achieve the same advantages as those disclosed with reference to the method described above or the wind power installation disclosed above. In particular, operation of the wind farm with an optimized total yield is made possible.

The combination of the wind farm with the particular configurations of the method described as preferred is also advantageous.

The controller of the wind power installation or of one of the wind power installations of the wind farm is preferably configured to increase the tip-speed ratio and/or the pitch angle in such a way that a maximum permissible thrust coefficient of the wind power installation is obtained.

The maximum permissible thrust coefficient of the wind power installation or of one of the wind power installations of the wind farm is preferably location-specific and is dependent in particular on the air density.

The wind power installation or one of the wind power installations of the wind farm preferably comprises a turbulence measuring unit for ascertaining a turbulence intensity, wherein the controller is configured to take the ascertained turbulence intensity into consideration when setting the tip-speed ratio and/or the pitch angle of a rotor of the wind power installation.

All known units for measuring turbulence intensity are conceivable here. The turbulence intensity is preferably derived from the measured wind speed using the turbulence measuring unit. Particularly preferably, the turbulence intensity is even calculated at a plurality of sites in a spatially resolved manner. The functional dependency of the tip-speed coefficient or of the pitch-angle coefficient can then be given directly by the plurality of turbulence intensities; alternatively a single mean or average value which represents the plurality of spatially resolved turbulence intensities can be determined by the turbulence measuring unit.

The controller of the wind power installation or of one of the wind power installations of the wind farm is preferably configured to set the tip-speed ratio and/or the pitch angle in consideration of the turbulence intensity in such a way that a substantially maximum power coefficient at a rotor of the wind power installation is obtained.

The wind power installation or one of the wind power installations of the wind farm preferably comprises an air density measuring unit for ascertaining an air density, wherein the controller is configured to take the ascertained air density into consideration when setting the tip-speed ratio and/or the pitch angle.

The present disclosure is particularly applicable to variable-speed, pitch-controlled wind power installations which are operated in the wake of another wind power installation. The installations have to be operable such that speeds and pitch angles can be set independently of one another. The installations have to have a sensor for determining a turbulence intensity.

BRIEF DESCRIPTION OF THE SEVERAL VIEWS OF THE DRAWINGS

The invention is explained in more detail below by way of example on the basis of exemplary embodiments with reference to the accompanying figures.

DETAILED DESCRIPTION

Figure 1:
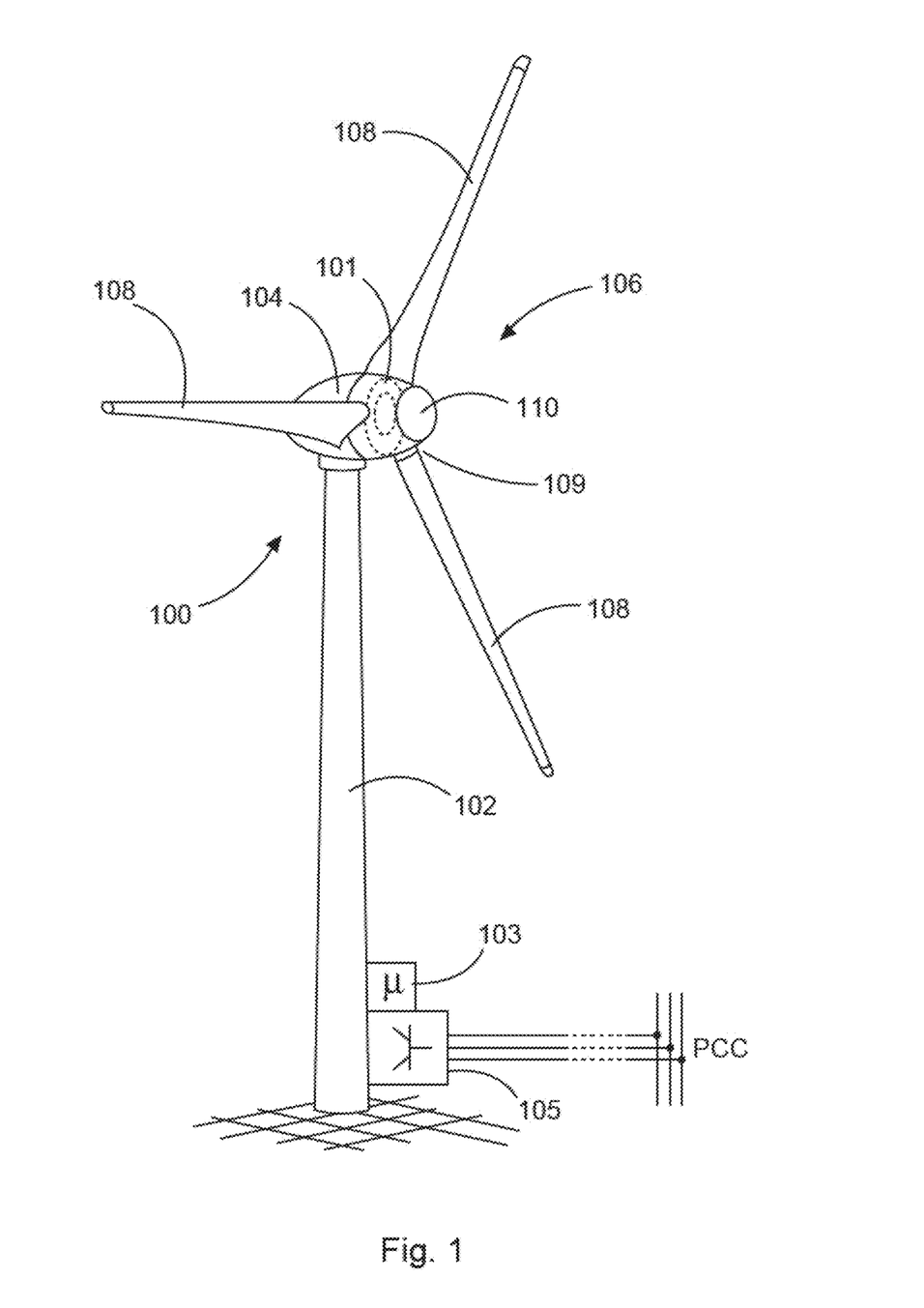
FIG. 1 schematically shows, by way of example, a perspective illustration of a wind power installation.

FIG. 1 shows a schematic illustration of a wind power installation according to the invention. The wind power installation 100 has a tower 102 and a nacelle 104 on the tower 102. An aerodynamic rotor 106 having three rotor blades 108 and a spinner 110 is provided on the nacelle 104. During the operation of the wind power installation, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 may be varied by pitch motors at the rotor blade roots 109 of the respective rotor blades 108.

The wind power installation 100 in this case has an electric generator 101, which is indicated in the nacelle 104. Electric power is able to be generated by way of the generator 101. Provision is made for an infeed unit 105, which may be designed in particular as an inverter, to feed in electric power. It is thus possible to generate a three-phase infeed current and/or a three-phase infeed voltage in terms of amplitude, frequency and phase, for infeed at a grid connection point PCC. This may be performed directly or else together with other wind power installations on a wind farm. Provision is made for an installation control system 103 for the purpose of controlling the wind power installation 100 and also the infeed unit 105. The installation control system 103 may also receive predefined values from an external source, in particular from a central farm computer.

Figure 2:
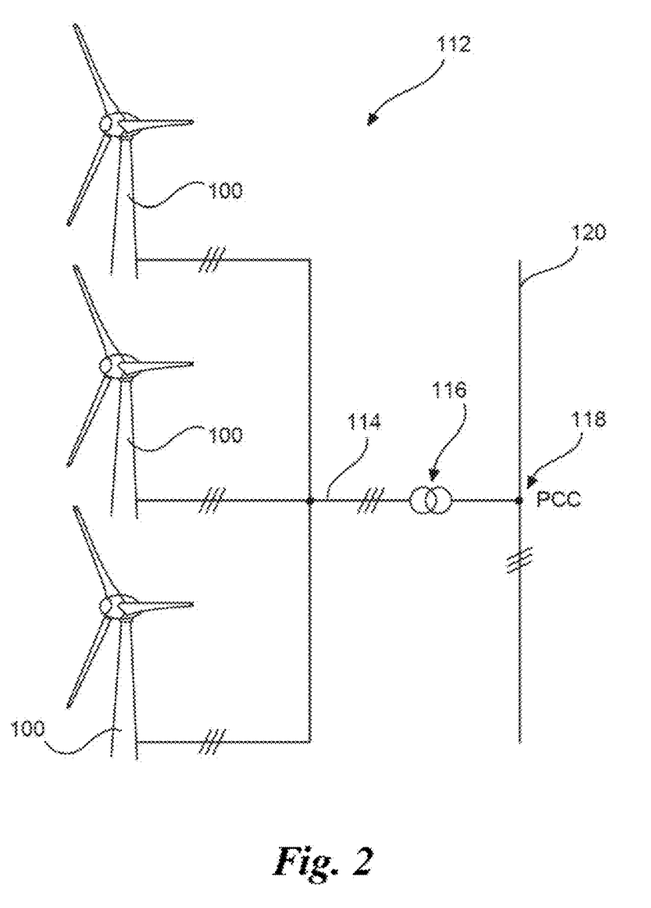
FIG. 2 schematically shows, by way of example, a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added together and a transformer 116, which steps up the voltage on the farm, is usually provided in order to then feed into the supply grid 120 at the infeed point 118, which is also generally referred to as a PCC. FIG. 2 is only a simplified illustration of a wind farm 112. By way of example, the farm grid 114 may also be designed in another way by virtue of for example a transformer also being present at the output of each wind power installation 100, to mention just one other exemplary embodiment.

In order to improve the yield from wind farms, the present disclosure proposes an alternative method which is meant to be used whenever at least two rows of wind power installations are located on a wind farm 112 and at least some of the installations of the rear row are therefore located in the wake of the installations in the front row, depending on the wind direction.

It is proposed here that the tip-speed ratio $\lambda$ in the part-load range of the rear installations is greater than the tip-speed ratios $\lambda$ of the front installations, that is to say the ratio of the tip-speed ratios in the part-load range of the rear installations to the front installation is always greater than one.

It is furthermore proposed that, optionally, further to the raising of the tip-speed ratios $\lambda$, the pitch angles $\gamma$ in the part-load range are also raised from the front installation to the rear installation.

It is thus proposed that the wind power installation 100 on a wind farm 112, which is in the wake of another wind power installation 100, is operated in the part-load range with a higher tip-speed ratio $\lambda$ and/or with a higher pitch angle $\gamma$ than the installations which are upstream in the wind and cause the wake.

Figure 3:
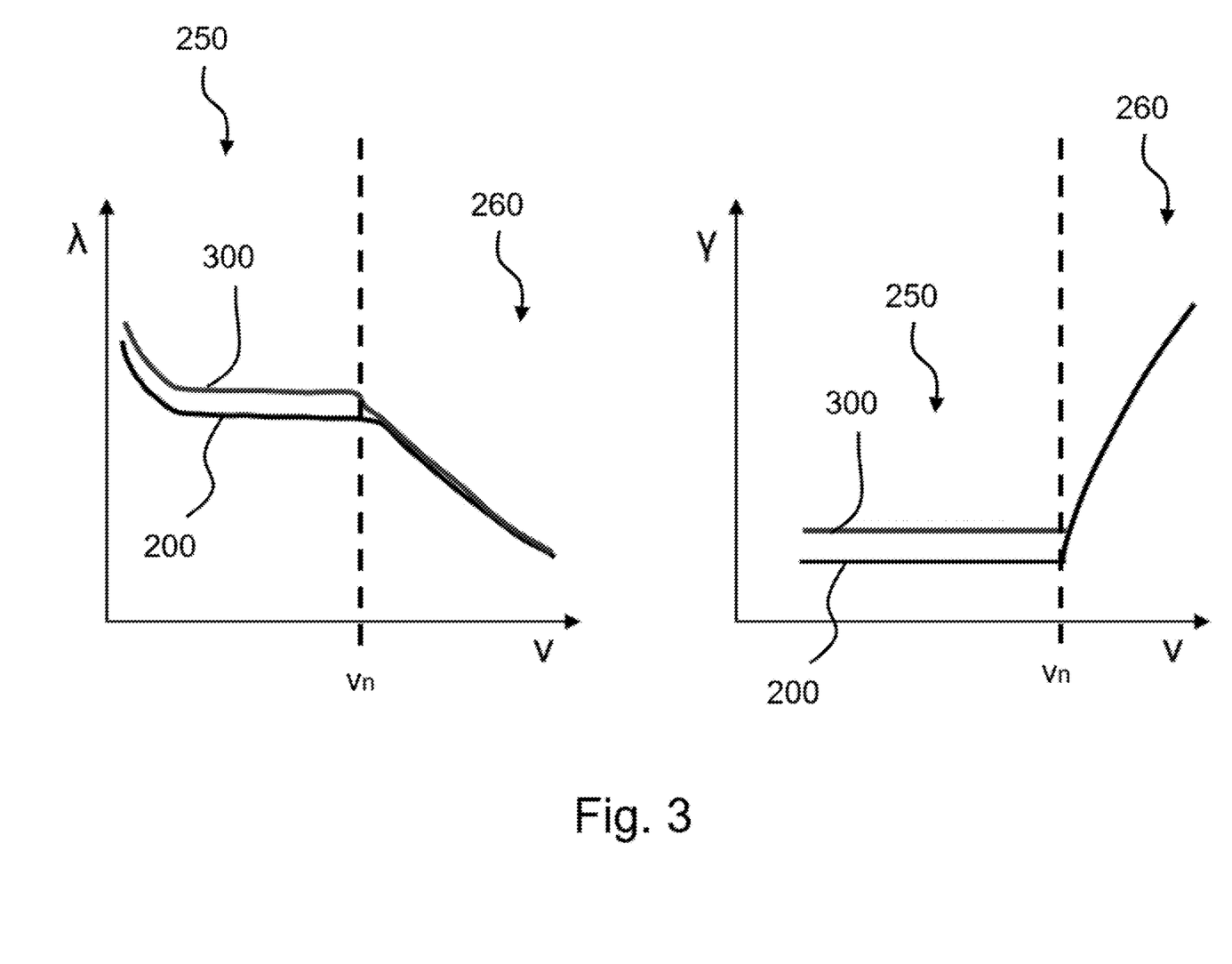
FIG. 3 schematically shows, by way of example, a comparison of the tip-speed ratio and the pitch angle, respectively, against the wind speed for front and rear wind power installations.

FIG. 3 schematically shows, by way of example, a comparison of the tip-speed ratio $\lambda$ and the pitch angle $\gamma$, respectively, on the vertical axis against the wind speed v on the horizontal axis for installations on a wind farm 112, wherein the lines 200 indicate the operational management for the installations in the front row, that is to say for installations with freely inflowing wind, and the lines 300 indicate the operational management for installations placed in a rear row, that is to say in the wake of the installations of the front row.

It is recognized that the procedure proposes operating the installations in the rear row, cf. line 300, with a higher tip-speed ratio $\lambda$, or with a higher pitch angle $\gamma$, than the installations in the front row, cf. line 200. This difference is present in a part-load range 250 at wind speeds v below a rated wind speed $v_n$, at which the installation is operated at rated power.

FIG. 3 should be understood to be schematic overall and the rated wind speed $v_n$ is accordingly also shown schematically at a transition between part-load range 250 and full-load range 260. While the full-load range 260 has wind speeds for which the lines 200 and 300 are of identical shape, that is to say the operational management of the installations in the rear row is identical to the operational management of the installations in the front row, there is a difference between the respective operational managements in the part-load range 250, that is to say that the lines 200 and 300 in the part-load range 250 are of different shape.

In other words, it is proposed that the ratio of the tip-speed ratios $\lambda$ or the pitch angles $\gamma$ of the rear installation to the front installation is always greater than one. The installation which is in the wake of another installation is thus intended to be operated with a higher tip-speed ratio and/or higher pitch angles than the installation which causes the wake.

The procedure is proposed since it can be assumed that the installations in the rear row that are set in this way generate more yield than installations which are operated in the rear row with tip-speed ratios λ and pitch angles γ that are identical in comparison with the front row.

The proposal is based on the recognition that a measure of turbulence, for example expressed by the turbulence intensity, increases in the wake of an installation, i.e., the turbulence intensity for the installations of the rear row is greater than the turbulence intensity of the installations of the front row.

Furthermore, it has been recognized that the maximum power coefficient of a rotor blade or of the whole installation shifts towards higher tip-speed ratios λ or higher pitch angles γ when turbulence intensity increases.

Figure 4:
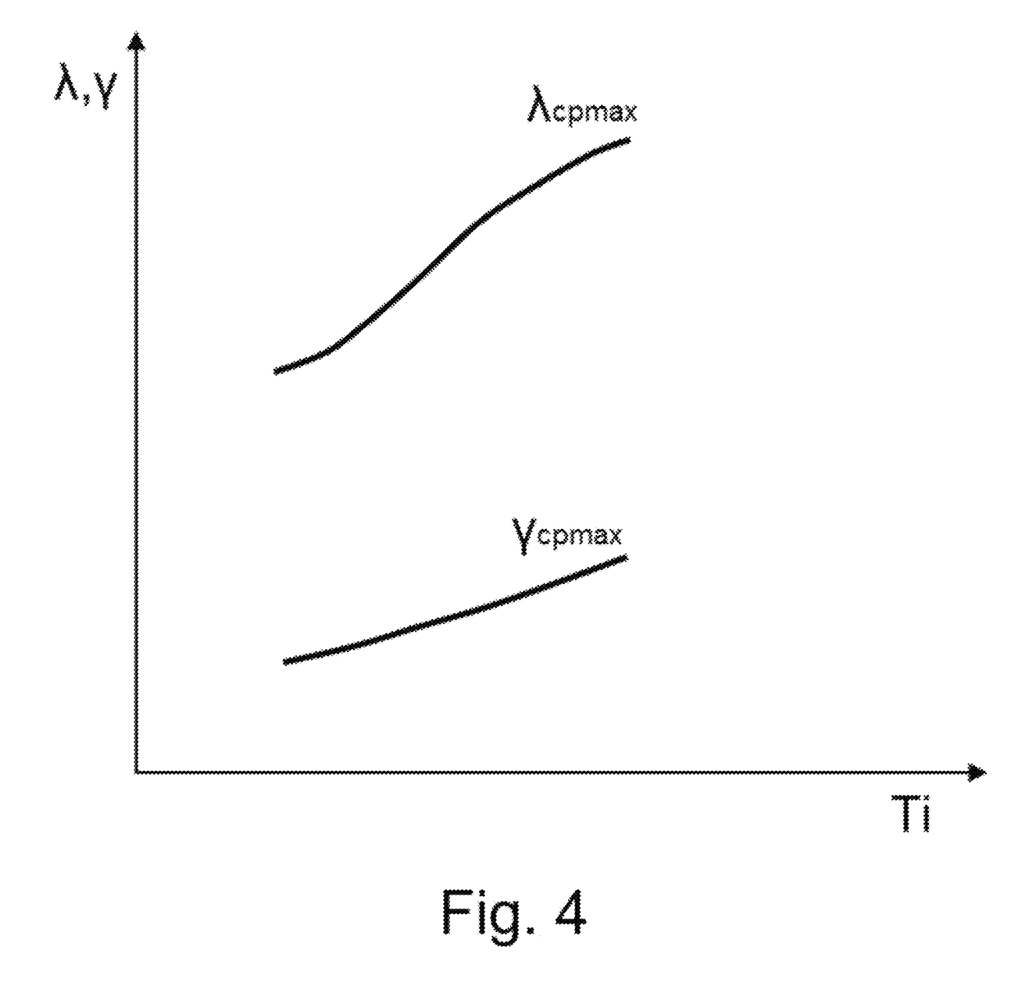
FIG. 4 schematically shows, by way of example, the characteristics of the tip-speed ratio and the pitch angle at the point of the maximum power coefficient against a measure of turbulence.

FIG. 4 schematically shows, by way of example, the tip-speed ratio $\lambda_{cpmax}$ and the pitch angle $\gamma_{cpmax}$ for which in each case the maximum power coefficient of the rotor blade is present, plotted against the turbulence intensity Ti of the inflowing wind on the horizontal axis.

It can be seen from FIG. 4 that the tip-speed ratio λ or the pitch angle γ at which the rotor blade has the maximum power coefficient $c_{pmax}$ increases as turbulence intensity increases. Thus, that is to say that the installation which is in the wake of another and is subject to inflowing wind with an increased turbulence intensity has to be operated with an increased tip-speed ratio and/or an increased pitch angle in order to harvest the maximum yield at the installations in the rear row, that is to say in order to be operated at the maximum power coefficient $c_{pmax}$.

The specific procedure in the proposal, in particular whether only the tip-speed ratio is raised or the tip-speed ratio λ and additionally the pitch angle γ, is dependent on the load situation at the location which has to be taken into consideration. It may therefore be expected that, in the proposal, comparatively larger loads are generated at the installations in the rear rows. This can be expected especially if only the tip-speed ratio λ at the installations of the rear row is increased, with the pitch angle γ remaining unchanged.

However, a combined procedure of increasing the tip-speed ratio and the pitch angle can also be chosen, which may lead to no increase in the installation loads. The proposal needs to be adapted to suit the load conditions at the location of the wind farm, and the operational management that can be implemented needs to be checked at the specific location.

Figure 5:
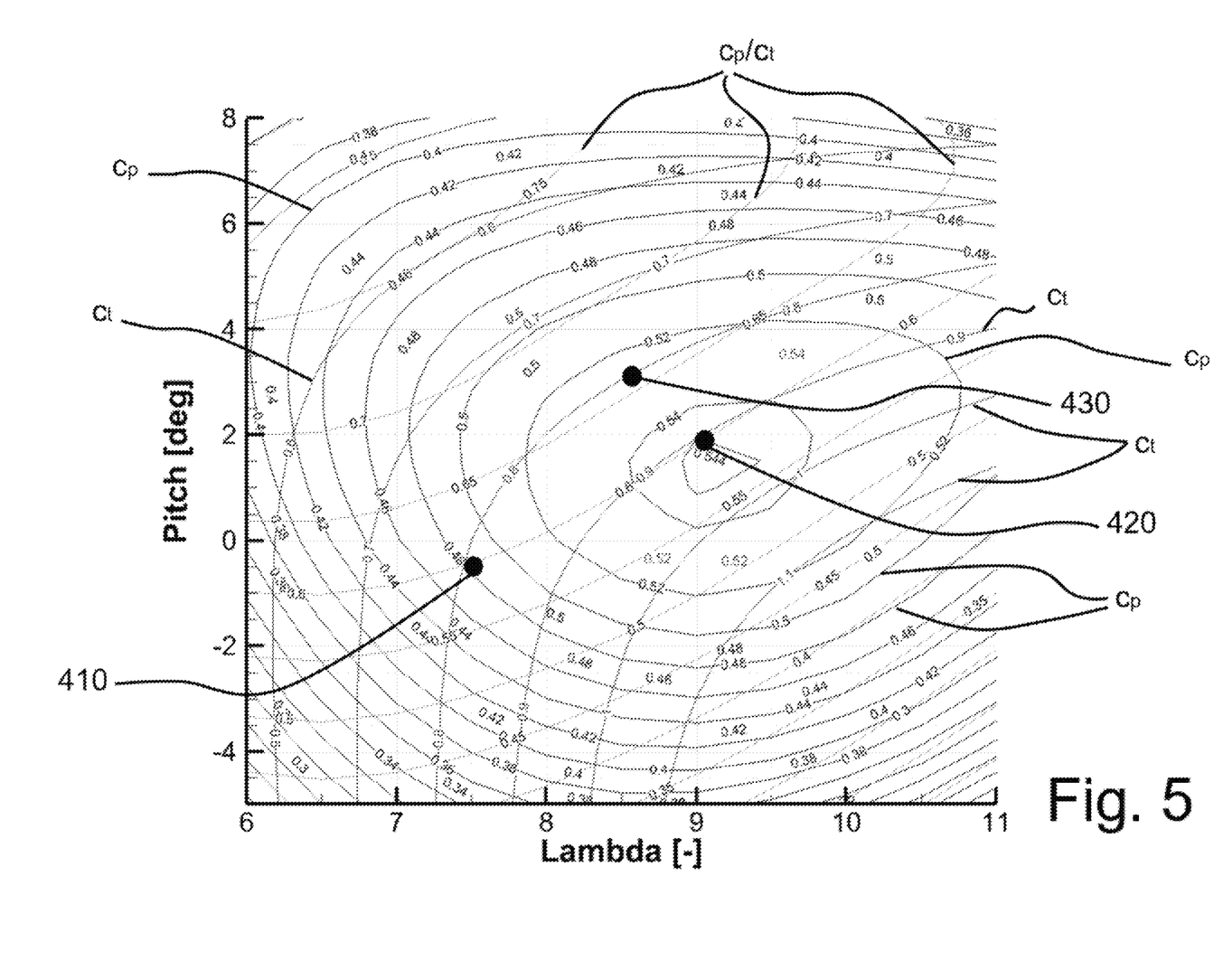
FIG. 5 schematically shows, by way of example, altitude lines for the power coefficient, the thrust coefficient and the ratio thereof against tip-speed ratio and pitch angle for a first combination of turbulence intensity and installation type.

FIG. 5 schematically shows, by way of example, altitude lines for the power coefficients $c_p$, the thrust coefficients $c_t$ and the ratio of the power coefficient and the thrust coefficient $c_p/c_t$ against tip-speed ratio λ and pitch angle γ for a determined type 1 of wind power installations 100 at a turbulence intensity Ti=A %, for example at a low turbulence intensity, for which no wake effects are to be expected.

Figure 6:
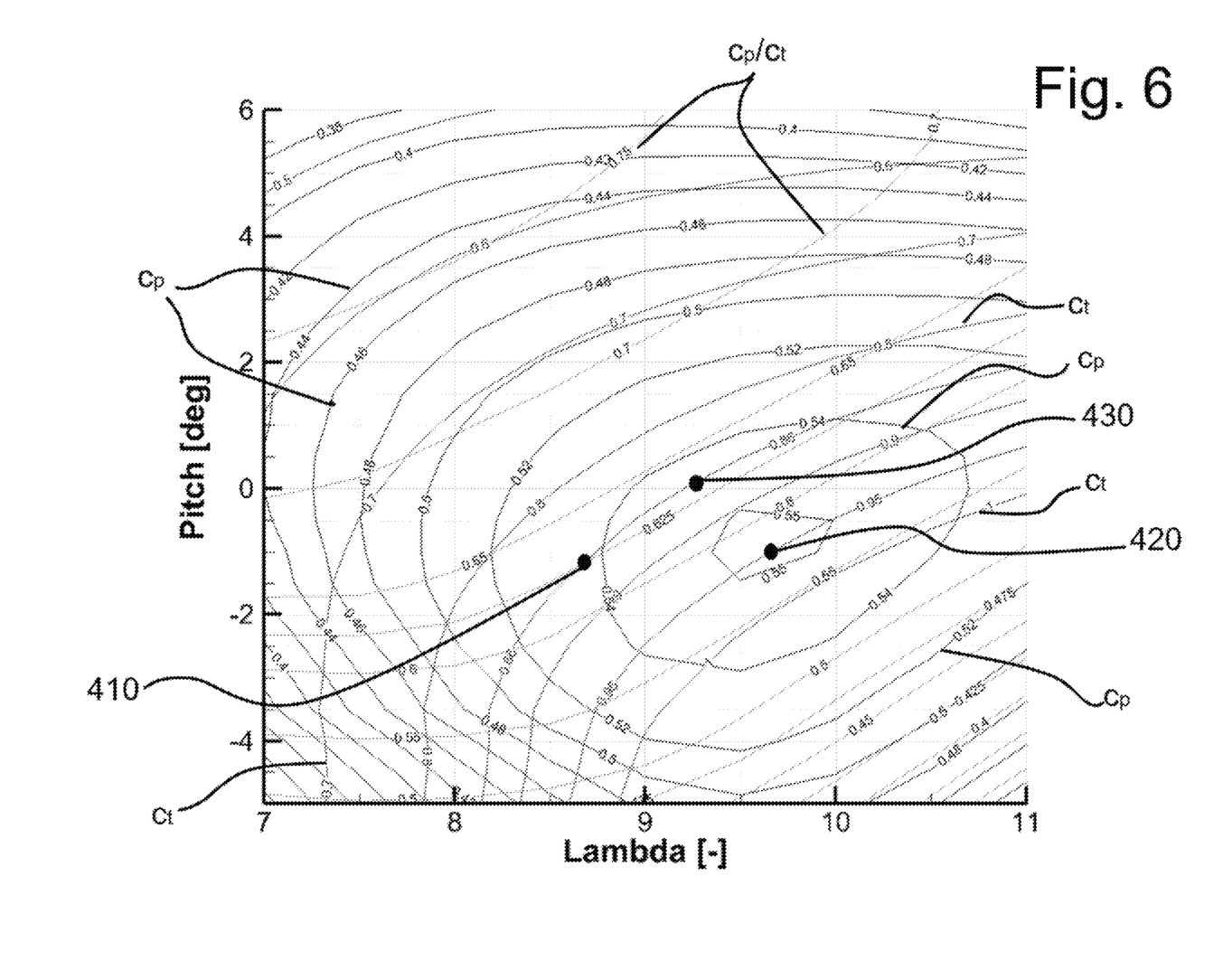
FIG. 6 schematically shows, by way of example, altitude lines for the power coefficient, the thrust coefficient and the ratio thereof against tip-speed ratio and pitch angle for a second combination of turbulence intensity and installation type.

FIG. 6 schematically shows, by way of example, altitude lines for the power coefficients $c_p$, the thrust coefficients $c_t$ and the ratio of the power coefficient and the thrust coefficient $c_p/c_t$ against tip-speed ratio λ and pitch angle γ for a type 2 of wind power installations 100 at Ti=B %.

The power coefficient $c_p$ is a dimensionless index for a wind power installation. It describes, at any point in time, what proportion of the power contained in the wind can be converted, or is converted at a certain operating point, into mechanical power of the rotor. The power coefficient is accordingly not a constant constructive index, but rather is dependent on changing influencing variables.

The power of the wind is primarily dependent on the wind speed. The mechanical power of the installation is in turn dependent on the wind speed upstream and downstream of the rotor. Additionally, the power of the wind and the mechanical power of the rotor are dependent on the density of the air and the rotor circle area. Simply put, the power coefficient can therefore be calculated using the wind speed upstream and downstream of the rotor. According to Betz' law, the air cannot be slowed down completely. A maximum power coefficient is thus reached when the wind speed downstream of the rotor corresponds to a third of the wind speed upstream of the rotor. Due to losses at the rotor, wind power converters only reach power coefficients of between approximately 0.4 and approximately 0.5 during normal operation, however.

The rotor thrust is the force which is exerted on the hub of the wind power installation 100 horizontally by the flow of air, or conversely on the flow by the wind power installation 100. Normalized with the axial force of the wind, the thrust coefficient is calculated therefrom. The retroactive effect of a wind power installation on the flow is dependent, inter alia, on its dimensionless thrust coefficients $c_t$. Thrust coefficients are therefore essential input variables for modelling shadowing in wind farms. The thrust coefficients used are generally calculated by the installation manufacturers. The highest thrust coefficients arise during power operation at low wind speeds and they fall constantly at medium and higher speeds. Accordingly, seen in relative terms, the mutual influence of wind power installations is greatest at low wind speeds. However, since the energy contained in the wind is then low and increases disproportionately with wind speed, the absolute mutual interference is ultimately greatest at medium wind speeds.

FIG. 5 and FIG. 6 are intended to clarify the statements made. The images each present, as mentioned, altitude lines for the aerodynamic power coefficients $c_p$, the thrust coefficients $c_t$ and the ratio of the power coefficient and the thrust coefficient $c_p/c_t$ against the tip-speed ratio and the pitch angle. The explicit values, in particular the values for pitch angle and tip-speed ratio, but more specifically the specified power coefficients $c_p$ and thrust coefficients $c_t$, should be understood merely as examples and not in a restrictive sense.

The images are compiled for two different installation types and for different turbulence intensities Ti, which are in the range 10%<Ti<30%.

The point 410 in FIG. 5 and FIG. 6 indicates in each case the point of the maximum aerodynamic power coefficient for the turbulence-free inflow at Ti=0%.

In FIG. 5 it will initially be seen that the maximum aerodynamic power coefficient shifts from the tip-speed ratio λ=7.5 and the pitch angle γ=−1° at Ti=0%, represented by the point 410, to λ=9 and γ=1.5° at Ti=A %, indicated by point 420.

If the installation were now operated at the turbulence intensity A % at the point 420, the thrust coefficient would also increase from $c_t$=0.8 to $c_t$=0.9; the ratio of power coefficient and thrust coefficient (altitude line $c_p/c_t$) would, however, remain constant and consequently, in the case of the operational management change in the turbulence-rich inflow, the power coefficient would increase in the same proportion as the thrust coefficient.

Thus, in order to be able to operate the installation at the maximum power at Ti=A % too, circumstances have to exist which compensate for the operational-management-related load increase, such as, for example, operation at a reduced-density location at which the designed loads of the installation are typically not reached. If this is not the case, operation of the installation at the point 430 at λ=8.5 and γ=3° is alternatively possible. The point 430 has been selected such that the ratio of $c_p/c_t$ reaches its maximum at a constant thrust coefficient $c_t$=0.8.

The point is accordingly selected such that a maximum power coefficient is realized for load neutrality. In contrast to the prior art, in which the installation would continue to operate at point 410 in the case of an inflow with increased Ti=A %, the aerodynamic power coefficient is significantly increased.

For installation type 2 (FIG. 6) the situation is somewhat different in this respect, since the shift of the maximum aerodynamic power coefficient from turbulence-free inflow Ti=0%, again represented by point 410, to turbulence-rich inflow at Ti=B %, represented by point 420, only changes the tip-speed ratio λ; the pitch angle γ is virtually unchanged, however. Thus, if the installation is required to be operated at the optimum power in the case of turbulence-rich inflow, the relevant increase in the thrust coefficient $c_t$ needs to be checked for permissibility at the specific location.

For operation with a constant thrust coefficient, a combination of tip-speed ratio increase and pitch angle increase again needs to be realized, in this example here for installation type 2 with approximately λ=9.25 and γ=0.3°, represented by point 430 in FIG. 6. For constant thrust $c_t$=0.86 the power coefficient is at the maximum here but lower than the optimum for this turbulence intensity and furthermore higher than at the operating point of installation type 2 for turbulence-free inflow Ti=0%, that is to say at point 410.

Thus, it turns out that, depending on location loads and installation type, the operational management of the installation when subjected to inflow conditions with increased turbulence intensity, for example on a wind farm when an installation is operated in the wake of another installation, has to be adjusted in terms of the tip-speed ratio and the pitch angle in the part-load range in such a way that an increase in the tip-speed ratio or a combined increase in tip-speed ratio and pitch angle is implemented. Particularly preferably, the combined increase takes place as a function of the turbulence intensity as the measure of turbulence.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind farm having a first wind power installation and a second wind power installation, wherein the second wind power installation is located in a wake of the first wind power installation in at least one wake wind direction, the method comprising:
determining a tip-speed coefficient from a ratio of a second tip-speed ratio of the second wind power installation to a first tip-speed ratio of the first wind power installation,
determining a pitch-angle coefficient from a ratio of a second pitch angle of the second wind power installation to a first pitch angle of the first wind power installation,
determining a turbulence metric at the second wind power installation, and
operating the first wind power installation and the second wind power installation in a part-load range, wherein at least one coefficient chosen from the tip-speed coefficient and the pitch-angle coefficient is a function of the turbulence metric at the second wind power installation and is greater than one.

2. The method according to claim 1, comprising increasing the second tip-speed ratio in such a way that a maximized power coefficient of the second wind power installation is obtained in consideration of a maximum permissible thrust coefficient.

3. The method according to claim 1, comprising increasing the second tip-speed ratio and the second pitch angle in such a way that a maximized power coefficient of the second wind power installation is obtained in consideration of a maximum permissible thrust coefficient.

4. The method according to claim 3, wherein the maximum permissible thrust coefficient is a location-dependent thrust coefficient which is dependent on at least one ambient condition chosen from an air density and wind speed.

5. The method according to claim 3, comprising determining whether to increase the pitch-angle coefficient, wherein the determining whether to increase the pitch-angle coefficient depends on operating conditions at a site of the first and/or second wind power installation.

6. The method according to claim 5, wherein the determining whether to increase the pitch-angle coefficient depends on location loads at the site and/or on an installation type of the second wind power installation.

7. The method according to claim 1, comprising:
determining a maximum power coefficient for the turbulence metric at the second wind power installation,
wherein an operating point related to the maximum power coefficient and the operating parameters tip-speed ratio and pitch angle are determined, and
operating the second wind power installation at the operating point having the maximum power coefficient if a resulting thrust coefficient is permissible at the location of the wind power installation.

8. The method according to claim 1, comprising setting the second tip-speed ratio and/or the second pitch angle depending on air density.

9. A wind power installation, wherein the wind power installation is located in a wake of a further wind power installation in at least one wake wind direction, wherein a tip-speed coefficient is determined from a ratio of a tip-speed ratio of the wind power installation to a tip-speed ratio of the further wind power installation and wherein a pitch-angle coefficient is determined from a ratio of a pitch angle of the wind power installation to a pitch angle of the further wind power installation, the wind power installation comprising:
a tower,
a nacelle, and
a controller configured to determine a turbulence intensity at the wind power installation and to operate the wind power installation in the wake wind direction in a part-load range in such a way that at least one coefficient chosen from the tip-speed coefficient and the pitch-angle coefficient is a function of the turbulence intensity at the wind power installation and is greater than one.

10. The wind power installation according to claim 9, wherein the controller is configured to increase the tip-speed ratio and/or the pitch angle in such a way that a maximum permissible thrust coefficient of the first wind power installation is obtained.

11. The wind power installation according to claim 10, wherein the maximum permissible thrust coefficient is location-specific and is dependent on air density.

12. The wind power installation according to claim 9, comprising a turbulence measuring unit for ascertaining a turbulence intensity, wherein the controller is configured to take the turbulence intensity into consideration when setting the tip-speed ratio and/or the pitch angle of a rotor of the wind power installation.

13. A wind farm comprising:
- a first wind power installation and a second wind power installation, wherein the first wind power installation is located in a wake of the second wind power installation in at least one wake wind direction, wherein a tip-speed coefficient is determined from a ratio of a tip-speed ratio of the first wind power installation to a tip-speed ratio of the second wind power installation, and wherein a pitch-angle coefficient is determined from a ratio of a pitch angle of the first wind power installation to a pitch angle of the second wind power installation, and
- a controller configured to determine a turbulence intensity at the first wind power installation and to operate the first wind power installation and the second wind power installation in a part-load range in such a way that at least one coefficient chosen from the tip-speed coefficient and the pitch-angle coefficient is a function of the turbulence intensity at the first wind power installation and is greater than one.

14. The wind farm according to claim 13, wherein the controller is configured to increase the tip-speed ratio and/or the pitch angle in such a way that a maximum permissible thrust coefficient of the first wind power installation is obtained.

15. The wind farm according to claim 14, wherein the maximum permissible thrust coefficient is location-specific and is dependent on air density.

16. The wind farm according to claim 13, comprising a turbulence measuring unit for ascertaining a turbulence intensity, wherein the controller is configured to take the turbulence intensity into consideration when setting the tip-speed ratio and/or the pitch angle of a rotor of the wind power installation.

17. The wind farm according to claim 13, wherein the controller is configured to set the tip-speed ratio and/or the pitch angle in consideration of the turbulence intensity in such a way that a maximum power coefficient at a rotor of the wind power installation is obtained.

18. The wind farm according to claim 13, comprising an air density measuring unit for ascertaining an air density, wherein the controller is configured to take the air density into consideration when setting the tip-speed ratio and/or the pitch angle.

* * * * *